United States Patent [19]
Lindeborg et al.

[11] Patent Number: 5,602,827
[45] Date of Patent: Feb. 11, 1997

[54] METHOD AND APPARATUS FOR CORRECTING A DEFECT IN A TOKEN RING NETWORK

[75] Inventors: Carl Lindeborg, Shrewsbury; Edward Carroll, Wrentham; James Moran, Methuen; David Bartolini, Charlton, all of Mass.; John Griesing, Santa Clara, Calif.; Liz Lindell, Sutton, Mass.; Anthony D. Walker, Rougemont; Bradley S. Trubey, Cary, both of N.C.

[73] Assignees: IBM, Armonk, N.Y.; 3COM Corporation, Santa Clara, Calif.

[21] Appl. No.: 508,794

[22] Filed: Jul. 28, 1995

[51] Int. Cl.$^6$ .................................................. H04J 3/14
[52] U.S. Cl. ..................... 370/223; 370/248; 371/20.6; 340/825.16
[58] Field of Search ................................. 370/13, 14, 15, 370/16, 16.1, 17.56, 85.4, 85.5, 85.12, 85.13, 85.14, 85.15; 371/20.6, 20.1, 20.5; 340/825.05, 825.06, 825.16; 395/180, 181, 182.01, 182.02, 183.01, 185.01, 185.08

[56] References Cited

U.S. PATENT DOCUMENTS

| | | | |
|---|---|---|---|
| 4,710,915 | 12/1987 | Kitahara | 370/85.12 |
| 4,899,142 | 2/1990 | Nakayashiki et al. | 370/16 |
| 5,319,644 | 6/1994 | Liang | 370/85.5 |
| 5,361,250 | 11/1994 | Nguyen et al. | 370/16.1 |
| 5,535,192 | 7/1996 | Trubey et al. | 370/16.1 |

*Primary Examiner*—Wellington Chin
*Assistant Examiner*—Huy D. Vu
*Attorney, Agent, or Firm*—McGlew and Tuttle

[57] ABSTRACT

Beacon recovery is performed separately on each module. After a module recognizes that a beacon condition has occurred, each module checks to determine if the defect or fault is on its module. If the defect is on the respective module, the module disconnects itself from the remaining modules in the network and transmits a beacon frame onto an upstream end of the group of stations on that module. Each port on the module is then tested to determine if the error lies in the corresponding station. This testing is based on the presence or absence of the beacon frame.

20 Claims, 9 Drawing Sheets

METHOD AND APPARATUS FOR CORRECTING A DEFECT IN A TOKEN RING NETWORK

FIELD OF THE INVENTION

The present invention relates in general to a token ring communication network, and in particular to an IEEE 802.5 communication protocol standard requiring beacon recovery on a distributed basis on each media module in a concentrator.

BACKGROUND OF THE INVENTION

A token ring network is a system for connecting a plurality of stations in order to have each station able to communicate with all other stations. Each station has an input line and an output line. The concentrator with the media module connects all of the lines so that signals on the output line of one station are delivered to the input line of the next downstream station. All these stations are thus connected in a line, with the output line of the last downstream station being connected to the input line of the first station. The stations are thus connected together in a ring. In order to organize the communication on the ring, a token is passed along the ring to indicate when a station can and cannot transmit onto the ring. When a station desires to transmit, it first determines if the ring is available. If the ring is available, the station transmits a frame onto the ring. The frame contains, among other things, a destination address of the station which is to receive the transmission, and a source address which is the address of the station generating the transmission. The frame then gets passed to the next downstream station. The downstream station looks at the destination address of the frame and if the frame is not destined for that station, the station then passes the frame onto the next station. When the frame reaches the destination station, the destination station reads in the data of the frame, and then continues to pass the frame along the ring. When the frame reaches the original source station, the source station removes the frame from the ring and then makes the ring available again for transmission.

One way to implement a token ring network is with a concentrator that contains one or more media modules. The media modules contain ports, and each station connects to a port in the concentrator. The media module and the concentrator connect all the ports to form the individual stations into a token ring.

If there is a defect in any of the stations, or in the lines connecting the stations to the ports, the frames may be prevented from travelling around the ring, and the token ring network is therefore inoperable.

Prior art token ring networks have a system called beacon recovery where each station emits its own beacon frame if it has not received any frames in a predetermined period. If a station receives a beacon frame, it enters a mode known as beacon repeat. In beacon repeat, the station passes subsequent beacon frames to the downstream stations. Therefore once a defect has occurred in such a token ring network, only the station immediately downstream of the defect will be issuing new beacon frames and the remaining stations will be passively repeating these beacon frames. After another predetermined period, a station will realize that it is downstream of the defect by the fact that it has not received frames and has been generating new beacon frames for longer than the predetermined period. Also since each station is usually knowledgeable of the stations upstream and downstream, a station upstream of the defect will realize that it is upstream of the defect by noticing that the new beacon frames are originating from its downstream station. Token ring beacon recovery protocol provides mechanisms by which stations both upstream and downstream of the defect will attempt to isolate the fault. In each case the station removes itself from the ring by dropping phantom current. The station performs a lobe media test. If it passes lobe media test, it rejoins the ring. If the station fails its lobe media test, it will not rejoin the ring.

There are many time periods which must expire and which have complicated relationships. Therefore the process of beacon recovery can take a relatively long time, especially if the defect is such that all of the time periods must be exhausted before the defect can be found and remedied.

The Institute of Electronic and Electrical Engineers (IEEE) has formed a well-known standard called the IEEE 802.5 communication protocol standard which is incorporated herein by reference. This IEEE 802.5 communication standard provides a general overview and background of the well-known token ring communication topology. In this standard, time limits are set for a station-based beacon recovery as described above. Fault isolation in such station beacon recovery can be in excess of 26 seconds, which can cause network disruption and loss of network sessions for individual stations. This is a relatively long period of time in a communication and is a large burden to the properly operating stations on the network.

U.S. Pat. No. 5,361,250 describes a centralized beacon recovery process, where an entity in the concentrator monitors the token ring for presence of beacon frames and then attempts to correct the defect. This reference first determines the last stations to be added to the ring and then disconnects these stations from the ring. If the ring has not recovered, then the centralized beacon recovery on the concentrator tries to determine the stations upstream and downstream of the defect and remove those stations from the ring. If this is not successful, this reference then removes all stations from the ring and gradually rebuilds the ring, one station at a time, until the defect is located.

Such a centralized beacon recovery system tends to be slow because a single Media Access Control (MAC) entity is used to isolate faults. Also, this entity must keep extensive information with regard to the individual ports and addresses of each station in the ring. As one can see, as the number of stations increases in a concentrator using centralized beacon recovery, the centralized beacon recovery system becomes more complicated, requires more resources and must perform more functions which slow down the recovery.

Also, many concentrators now have the ability to support a plurality of different and separate token ring networks on one concentrator, or even one media module. In such a centralized beacon recovery system, a separate centralized beacon recovery system will be needed for each token ring network. Resources must be available on the concentrator then to perform such a centralized beacon recovery system for every possible token ring network that could be formed on the concentrator. The number of possible token ring networks is especially large, especially when port-switchable modules are using the concentrator which can connect one port to any other port to form a separate token ring network. U.S. Pat. No. 5,361,250 is, however, very informative with regard to the state of the art and is therefore incorporated herein by reference.

U.S. Pat. No. 5,319,644 is also very informative with regard to the state of the art and is incorporated by reference.

SUMMARY AND OBJECTS OF THE PRESENT INVENTION

It is an object of the present invention to reduce the time and resources needed to remove defects or faults in stations, or the lines connecting the stations to ports of a media module in a concentrator. The present invention accomplishes this by implementing a distributed beacon recovery system, wherein each media module performs beacon recovery on just the stations connected to each respective module.

A concentrator can contain a plurality of media modules, with each media module containing a plurality of ports. The media module forms the stations connected to ports of the media module into a portion of a ring. Rings may exist entirely on a media module, or the concentrator may link all other ring portions on other media modules to form a complete ring. Rings that are formed entirely on the media modules are referred to as isolated rings. Rings that are made up of portions that exist on a plurality of media modules are referred to as common rings. Common rings consist of ring portions that are connected to each other via a backplane of the concentrator. Each media module has processor means for monitoring frames received from and transmitted onto the backplane ring. In the case of isolated rings, the media module will monitor frames at an equivalent points, just downstream of the last port, and immediately upstream of the first port. The stations and their respective ports of a media module are formed into a group. An upstream end of the group receives frames from the backplane, and a downstream end of the group delivers frames to the backplane ring.

If there is a defect on the token ring, beacon frames will either be generated by the individual stations or the processor on the individual media modules, depending on how the defect is detected. When a media module receives a beacon frame, the module enters beacon recovery and will begin transmitting beacon type 1 frames at a point on the module, in the ring portion downstream of ports and Ring In trunk port. If the media module receives a beacon type 1 frame at a point downstream of ports and the Ring In trunk port, after entering beacon recovery, it will stop transmitting its own beacon type 1 frames and participates passively in beacon recovery, monitoring progression of beacon frames.

The module processor monitors the upstream end and the downstream end of the group of stations to determine if beacon frames delivered to the upstream end have successfully passed through all of the stations to the downstream end of the group. If the module processor detects that beacon frames are being received at the point just upstream of the first station, but are not passing through all of the stations, the module knows that the fault is "on module" and the port fault identification phase is entered.

In the port fault identification phase, the module isolates the ring portion from the backplane. A beacon frame is then transmitted onto the upstream end of the group of stations. The defective station, or lines, leading from the station to the port, can be found by one of two methods.

The method used to find the defect depends on the type of media module. A concentrator can either have a module-switched media module or a port-switched media module. As described previously, a concentrator can support a plurality of different token rings. In a module-switched media module, the entire module, along with its ports and stations, are switched to established rings on the concentrator. In a port-switched module, each individual port and its associated station, can be independently connected to any one of the rings established on the concentrator.

Each port on a port-switched module contains a ring monitor which can detect the presence of a beacon frame on an upstream side of the respective port. During the port fault identification phase, the module checks each ring monitor for the presence of a beacon frame. The station immediately upstream of the most upstream ring monitor not indicating a beacon frame is considered to contain a defect. The media module then removes or communicatively isolates the defective station from the module by bypassing the associated port. This is done repetitively for all ring monitors continuing to not detect beacon frames.

In a module-switched media module, the downstream end of the group of stations is monitored for a beacon frame after the beacon frame has been transmitted onto the upstream end of the group. The module then bypasses or wraps each active port on the media module until a beacon frame is received at the downstream end of the group. The last port bypassed before receiving the beacon frame at the downstream end of the group is considered to be the defective port.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
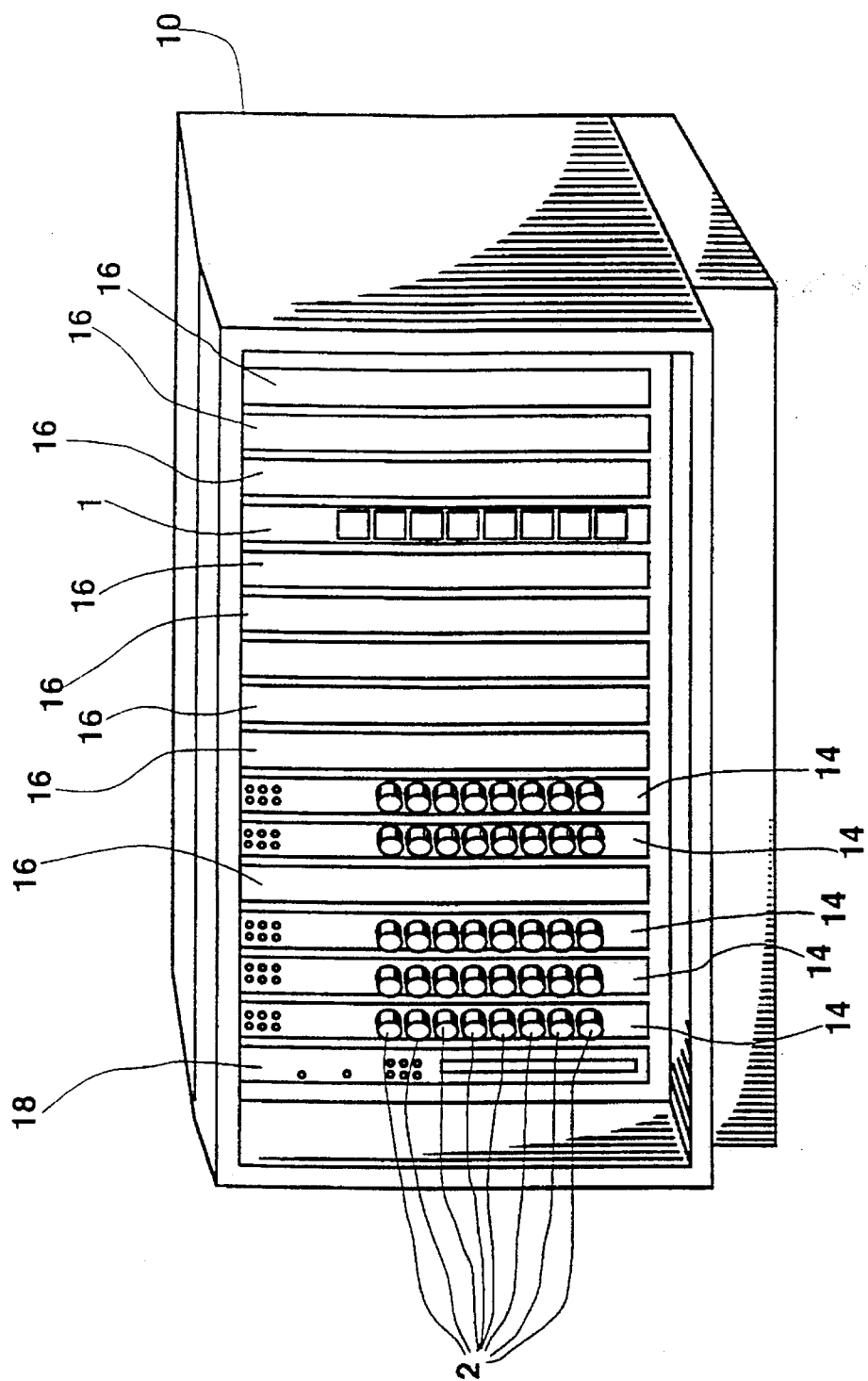
FIG. 1 is a view of a concentrator.
Figure 2:
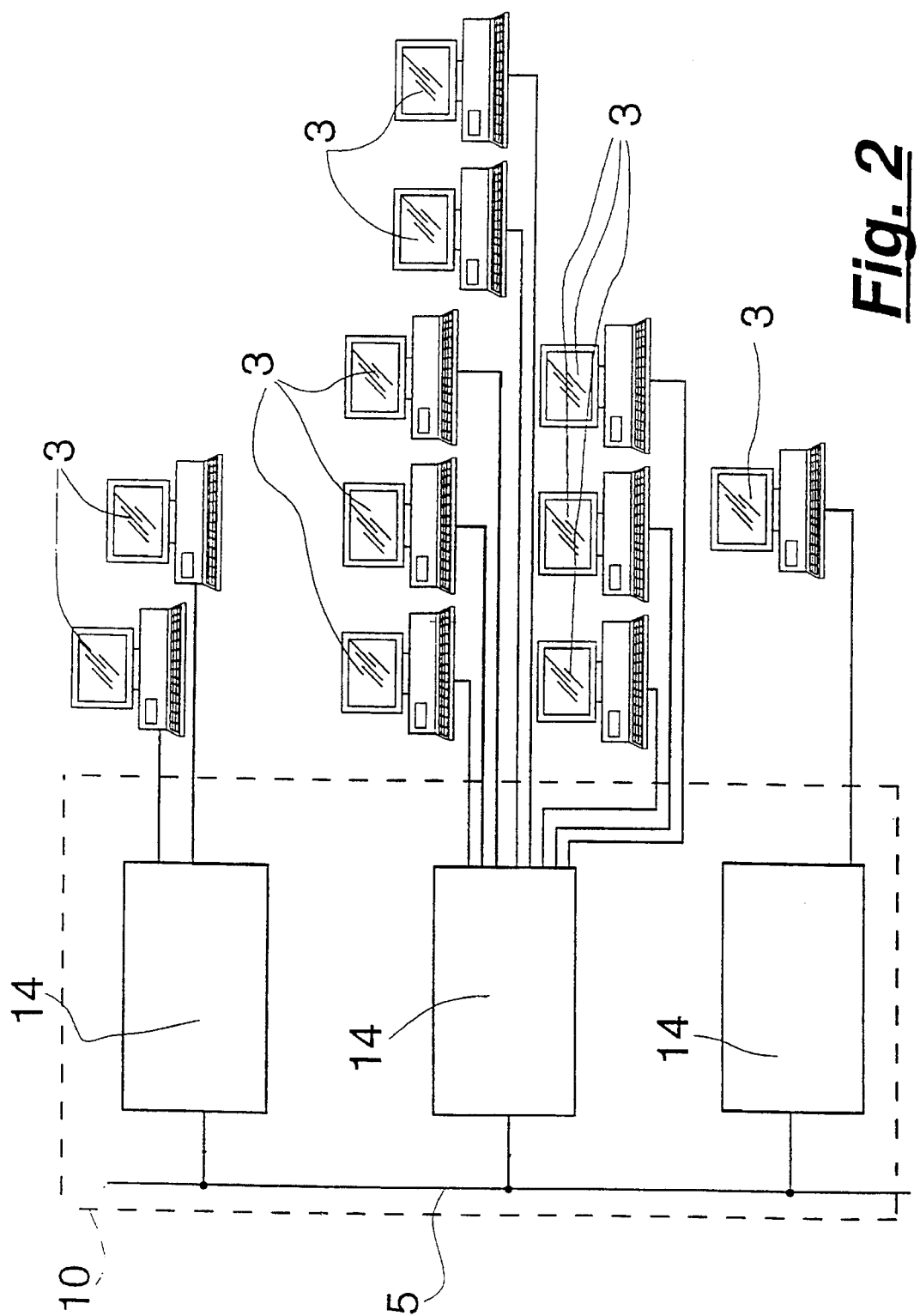
FIG. 2 is a schematic view of a plurality of stations connected to a plurality of media modules inside a concentrator.

Referring to the drawings, especially FIG. 1, a concentrator 10 contains a plurality of media modules 14 and a plurality of empty slots 16 which can be filled with modules. Each of the media modules 14 have a plurality of ports 2. As shown in FIG. 2, a plurality of stations can be connected over lines or lobes 4 to the ports 2 of media modules 14. The concentrator 10 has a backplane ring 5, of which a portion is shown in FIG. 2. The backplane ring 5 connects the modules 14 to form a token ring network. If the modules 14 are module-switched media modules, then the stations attached to one of the media modules could form their own ring, or form a ring with any of the other media modules 14. If the module 14 is a port-switched module, then it would be possible for each station to independently connect to any ring on the concentrator or form a ring between any of the stations on the port-switched module.

It is also possible to connect a plurality of concentrators through bridge or router modules 1. In this way, the modules on several different concentrators can be connected to form a single ring or a plurality of rings. In the present invention, the beacon recovery is performed independently on each module and therefore is independent of the number of modules and/or the number of concentrators connected. Each module contains a module processor for performing beacon recovery.

Figure 3:
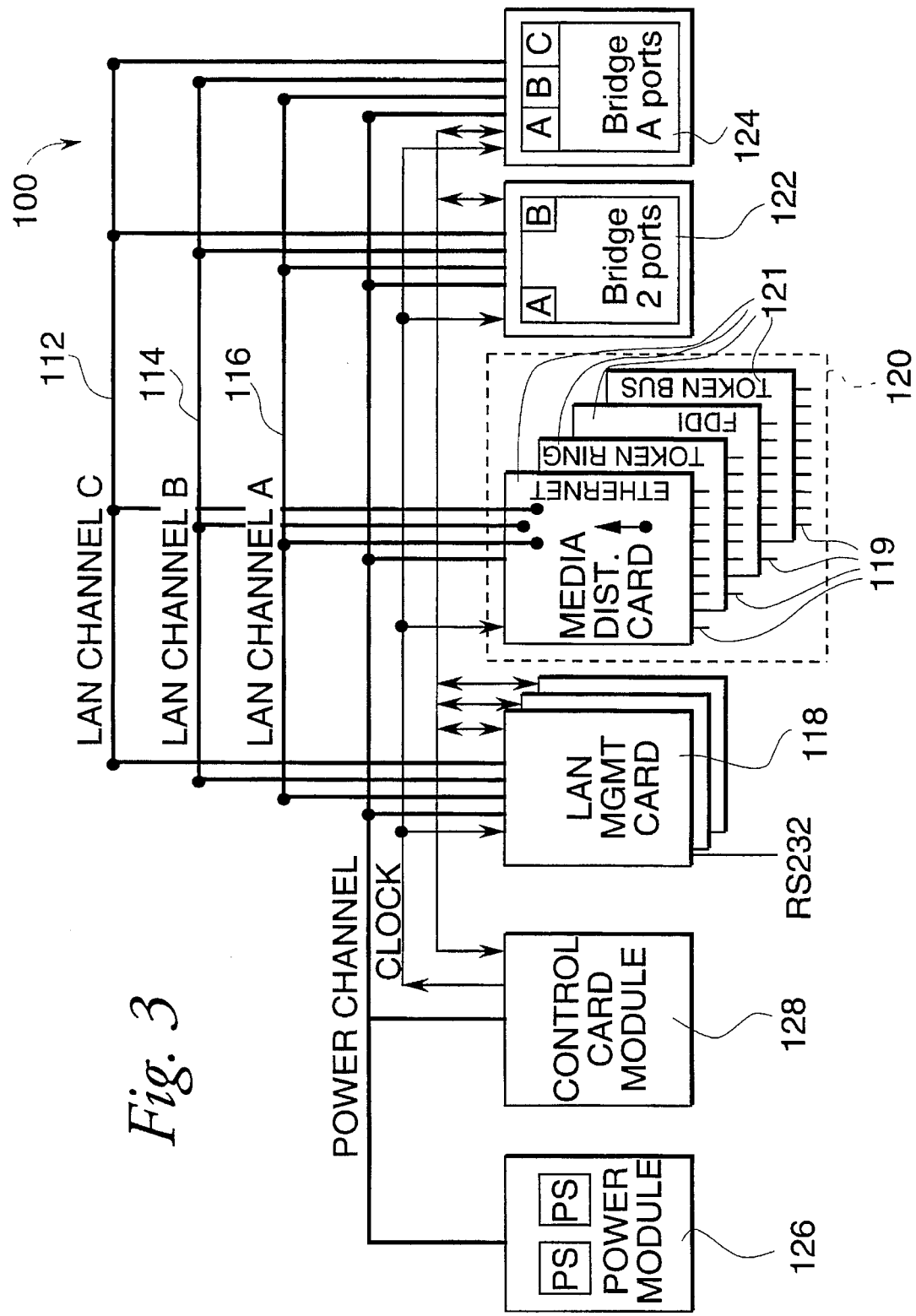
FIG. 3 is a schematic view of a ring formed on a concentrator.

As shown in FIG. 3, a plurality of media modules 14 are shown as module A, B and C, connected by a primary ring or backplane 5. A secondary ring and trunk ports are shown and are commonly used among token ring modules in a concentrator, however, these features are not essential to the present invention.

There are three ways that beacon recovery can be performed by a module. The module can detect the receipt of a beacon frame, from one of its own stations, trunk connections, or from the backplane. The module can also perform beacon recovery if the module discovers that communication patterns on its portion of the ring are not operating according to token ring protocol. The module processor maintains token- and monitor-present timers for each active ring on the module or the assigned ring in the case of a module-switched module. The token ring timers maintained by the module processor expire in approximately twice the period of those implemented in token ring stations. If one of these token ring protocol timers expire, the module processor will initiate the beacon recovery process on that ring. The third course for performing beacon recovery is if any proprietary trunk fault indicators are detected by the module processor.

If an individual station does not detect proper operating conditions, it can only generate a type 2, 3 or 4 beacon frame. If a media module 14 detects protocol timeout, trunk segment fault or receives a beacon frame at a port or trunk ring monitor 6 of the group of stations in a media module 14, the module processor of that media module will enter beacon recovery and transmit beacon type 1 frames on the downstream end 8 of the group of stations. If the media module receives a beacon type 1 frame at 12, after entering beacon recovery, the media module will stop transmitting its own type 1 frames on the downstream end 8. This module will then participate passively in the beacon recovery process where the frames received from the backplane 5 will be processed normally along the group of stations.

The stations 3 are connected to the media modules 14 by lobes 4. The lobe for the middle station in module 14B has a break. Therefore, the station 3 immediately downstream of the break will not be receiving proper token ring frames and will generate one of type 2, 3 or 4 beacon frames. Module 14C will receive these type 2, 3 or 4 beacon frames on its upstream end 7 and then generate type 1 beacon frames on its downstream end 8. Module 14A will receive type 1 beacon frames on its upstream end 7, and therefore will process the frames passively through all of the stations on module 14A. The type 1 beacon frames will then exit from the downstream end 8 of module 14A and be received by the upstream end 7 of module 14B. Since module 14B is receiving a type 1 beacon frame, it will process it passively. However, because of the break in the lobe 4 of one of these stations 3, a type 1 beacon frame will not be present at the downstream end 8 of module 14B. Thus, when a type 1 beacon frame is received by a media module 14, that module is not considered to be immediately downstream of the fault or defect. Once the token ring has stabilized after the occurrence of a fault, only the module directly downstream of the fault should be transmitting its own beacon type 1 frames.

A predetermined time interval is allowed to expire in order to have the token ring stabilize. At the end of this stabilization time period, the module processor on each module determines if it is receiving beacon type 1 frames on an upstream end or downstream end of the respective module or group. If beacon type 1 frames are being received at the upstream end, but not at the downstream end, the fault is considered to be "on module". When the fault is found to be "on module", the port-port fault identification phase is entered.

Figure 4:
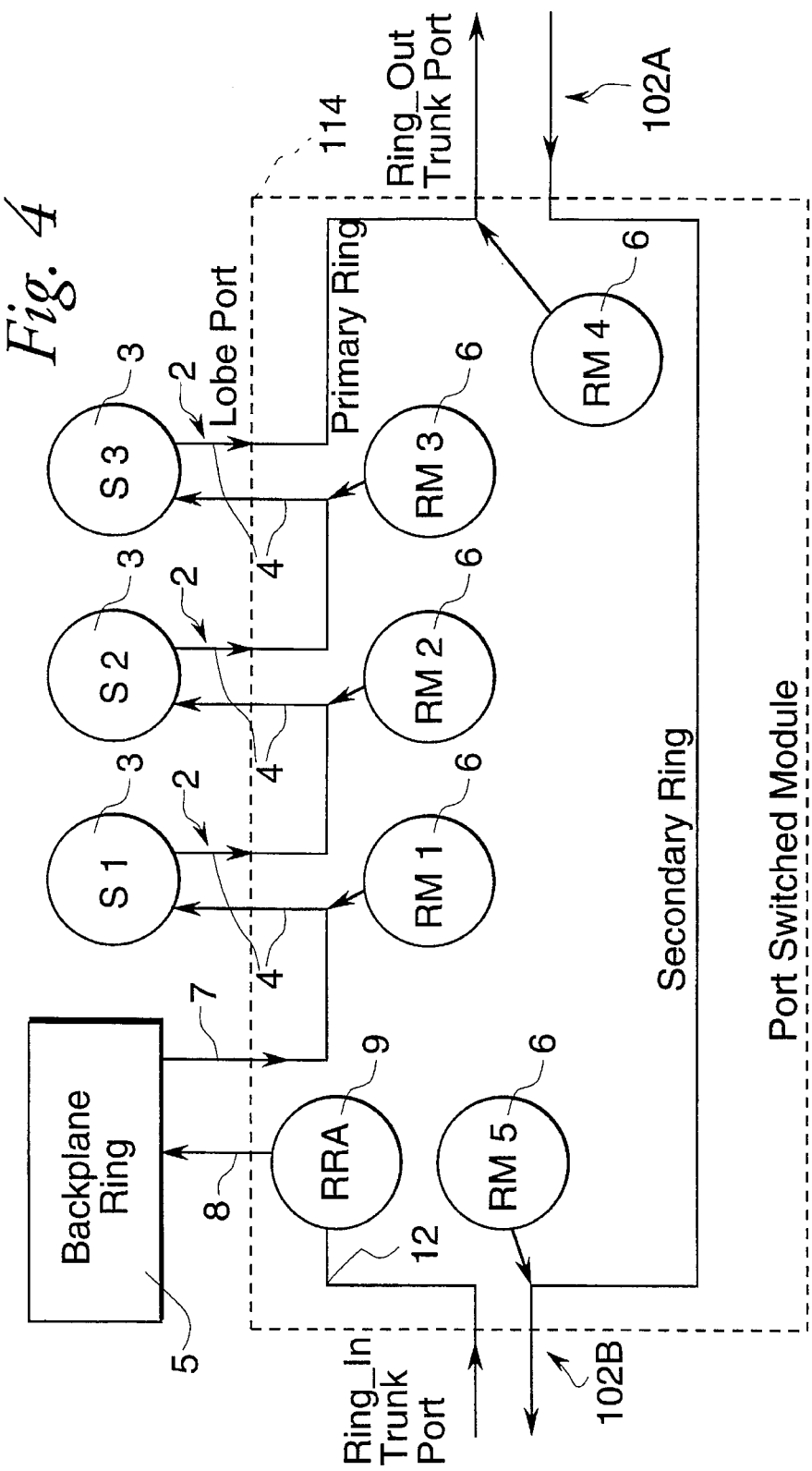
FIG. 4 is a view of a ring formed on a port-switched module.

Port-switched media modules are constructed differently than module-switched media modules. FIG. 4 shows a port-switched module 114. Port-switched modules contain ring monitors 6 positioned at an upstream end of each port 2. Each port 2, whether for a lobe 4 or for a trunk or secondary ring, contains a ring monitor 6. Each ring monitor may be configured to receive beacon frames. The source address, the destination address and the address recognizer indicator bits of each supportive frame type is available to the module processor. In the case of beacon frames, the beacon type field is available to the module processor as well. Ring monitors are also configured to report beacon frames. Each ring monitor may be instructed to monitor the upstream side (data stream transmitted from the concentrator port to the station) or downstream side (data stream received by the concentrator port from the station) of a port. The port-switched module 114 also contains a ring recovery ASIC (Application Specific Integrated Circuit) 9. On port-switched modules 114, the ring recovery ASIC 9 is allocated to a specific ring after a beacon event has been detected on that specific ring. The ring recovery ASIC a has both receive and transmit functions. The receive function of the ring recovery ASIC 9 may be configured to detect tokens and to receive monitor-present and beacon frames. The source address, the destination address, and address-recognized indicator bits of each supported frame type are available to the module processor. In the case of beacon frames, the beacon type field is available to the module processor as well.

When the module processor of a port-switched module 114 performs beacon recovery, the most upstream ring monitor 6, in this case RM1, monitors for receipt of beacon frames and reports the beacon frames to the module processor. In a typical situation, as shown in FIG. 4, the module processor would assign the ring monitor 6, represented by RM4, to monitor the downstream end. In the event that the ring-out trunk port 102A is wrapped or disabled, the module processor would assign the ring monitor 6, labelled as RM5, to monitor the downstream end of the group of stations 3. In the case that both ring-out port trunk 102A and ring-in trunk port 102B are wrapped, disabled, or not present on the module, the module processor would assign the ring recovery ASIC 9 to monitor the downstream end of the group of stations 3. The media module will continue to instruct the ring recovery ASIC 9 to transmit its own beacon type 1 frames until the fault isolation/stabilization time expires or until a beacon type 1 frame is received at 12 (received by the ring recovery ASIC 9).

Figure 5:
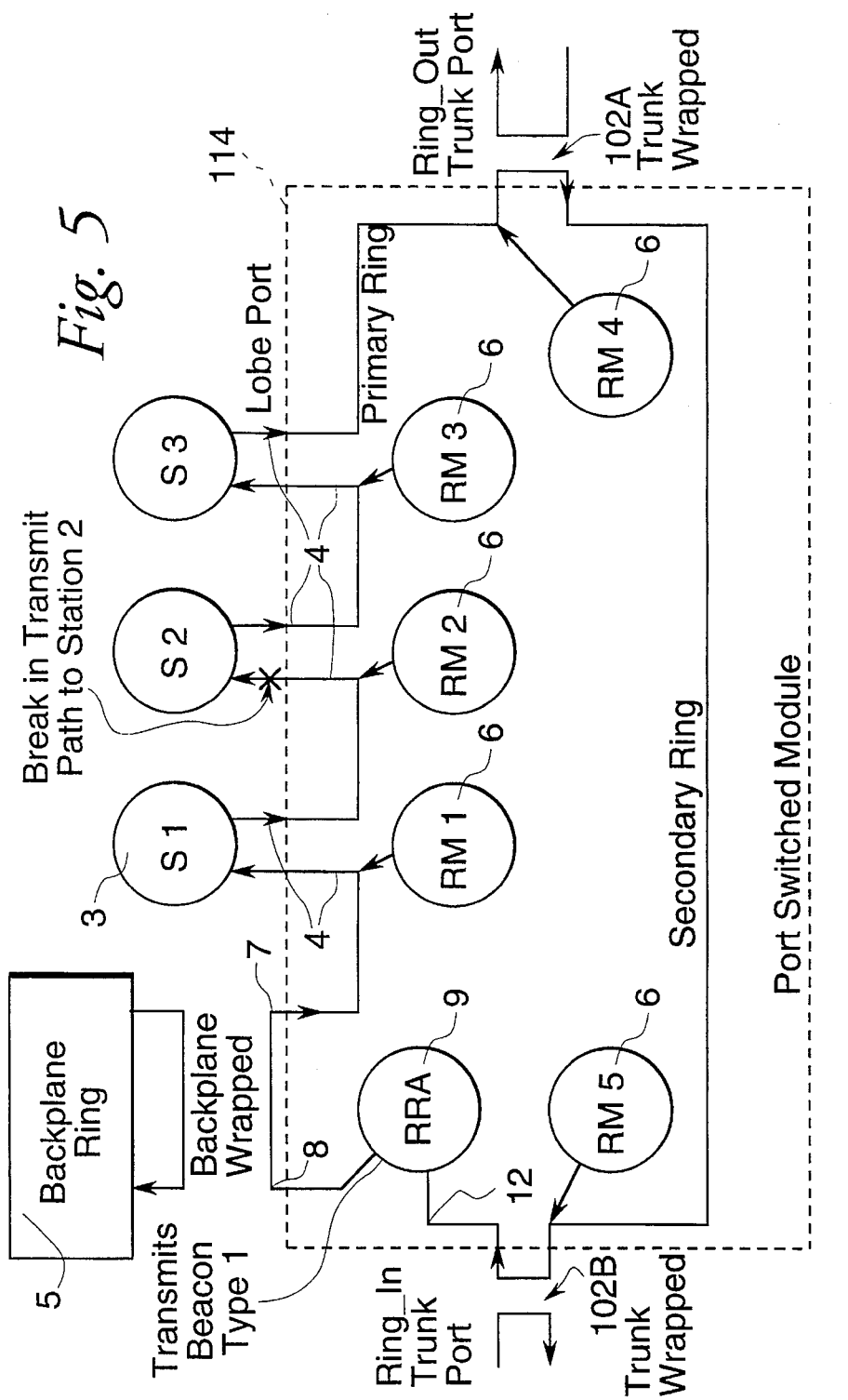
FIG. 5 is a schematic view of a port-switched module in fault-identification phase.
Figure 6:
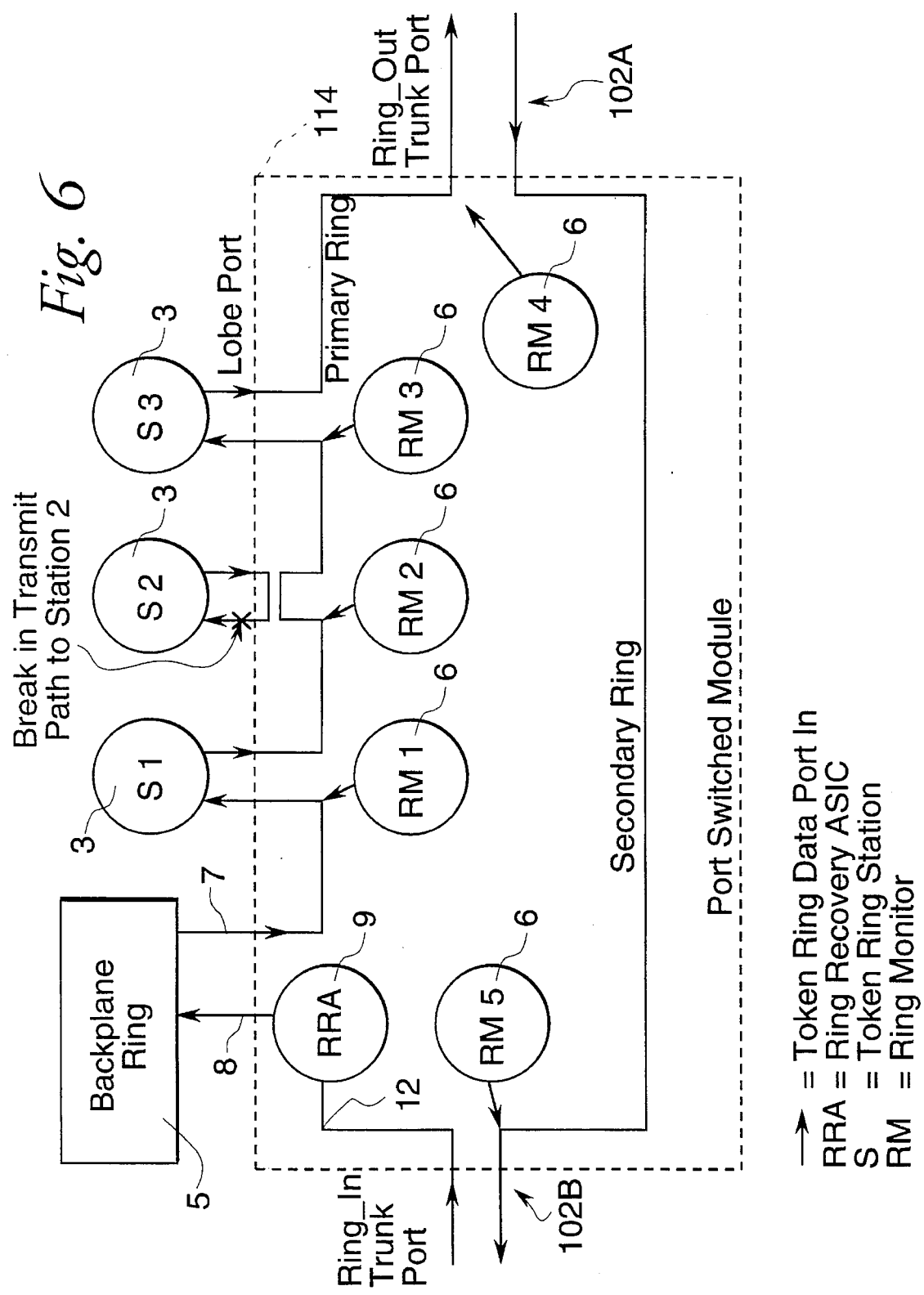
FIG. 6 is a schematic view of a port-switched module with a defective station being isolated from the module.

After the stabilization time, and if the module processor determines that beacon type 1 frames are being received at the upstream end of the group but not at the downstream end of the group, the port-port fault identification phase is entered. As shown in FIG. 5, during the port fault identification phase, the port-switched media module 114 is isolated from other modules on the ring. The upstream end 7 and the downstream end 8 of the module is wrapped, as well as any trunk ports 102A and 102B. The ring recovery ASIC 9 is configured to transmit beacon type 1 frames, as shown in FIG. 5. The module processor systematically checks the ring monitor of each active port participating in the defective ring. The module processor identifies the most upstream ring monitor where the beacon type 1 frames are not received. Since the ring monitors 6 are positioned on the upstream end of each port, the fault is identified on the port immediately upstream of the most upstream port/ring monitor which does not receive the beacon type 1 frame. The fault is removed by the module processor by wrapping the faulted port. The port-switched module 114 is then reconnected to the backplane ring 5 and the ring-out trunk port and the ting-in trunk port 102A and 102B are reconnected, as shown in FIG. 6.

Figure 7:
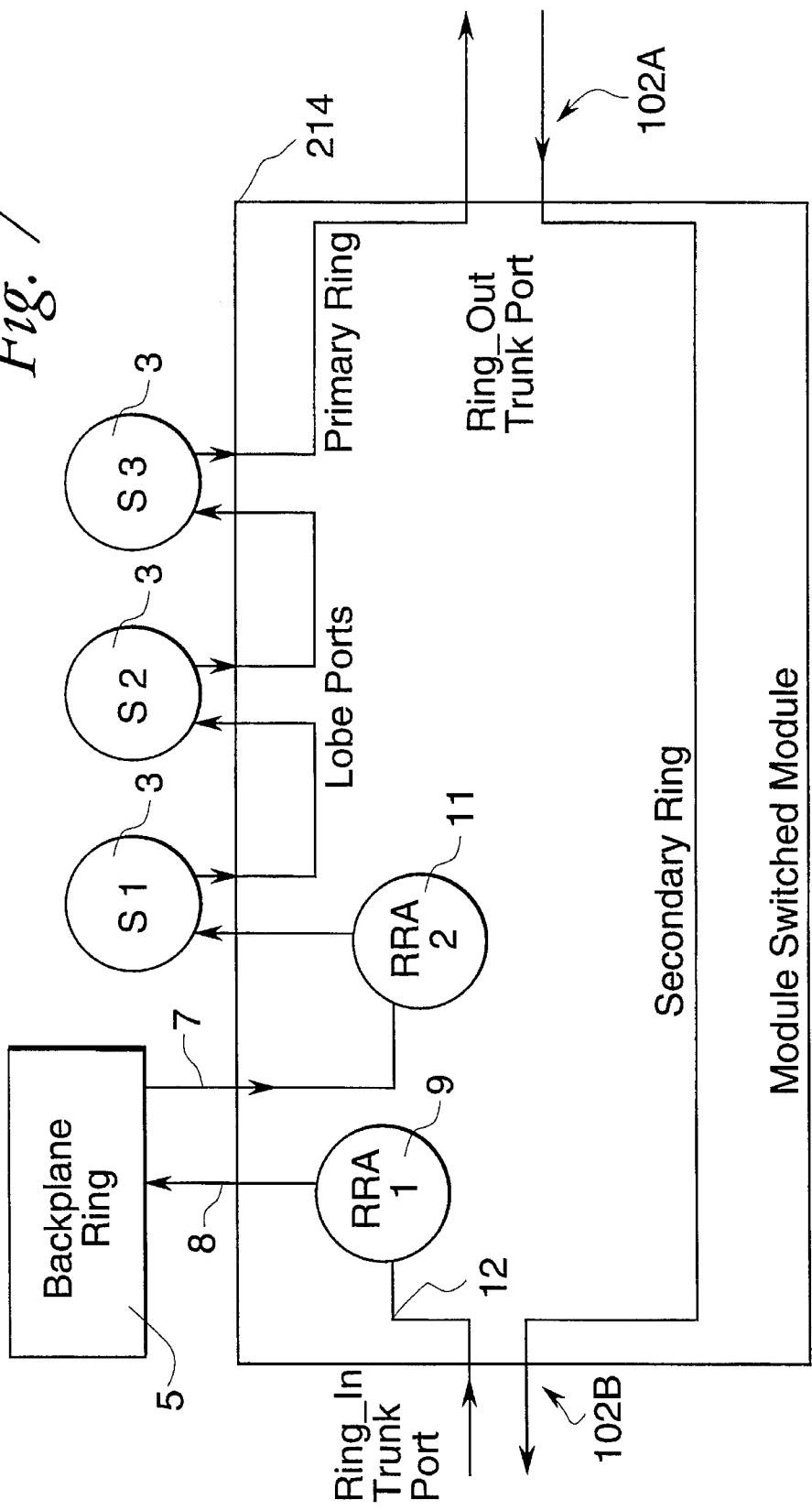
FIG. 7 is a schematic view of a module-switched module.

A module-switched module 214, as shown in FIG. 7, does not contain ring monitors. Therefore, in addition to the ring recovery ASIC 9 which is positioned at the downstream end 8 of the module, an upstream ring recovery ASIC 11 is included. Upstream ring recovery ASIC 11 is similar to the downstream ring recovery ASIC 9. If a media module 14 detects protocol timeout, trunk segment fault or receives a beacon frame at either ring recovery ASIC 9 or 11, the module processor of that media module will enter beacon recovery and instruct the ring recovery ASIC 9 to transmit beacon type 1 frames on the downstream end 8 of the group of stations. If the media module 14 receives a beacon type one frame at 12, after entering beacon recovery, the media module will stop transmitting it own beacon type 1 frames at the down stream end 8. This module will then participate passively in the beacon recovery process where frames received from the backplane will be passed along normally along the group of stations. After a stabilization period, if type 1 beacon frames are being received by the upstream ring recovery ASIC 11, but not by the downstream ring recovery ASIC 9, the fault is considered to be "on module" and the port-port fault identification phase is entered.

Figure 8:
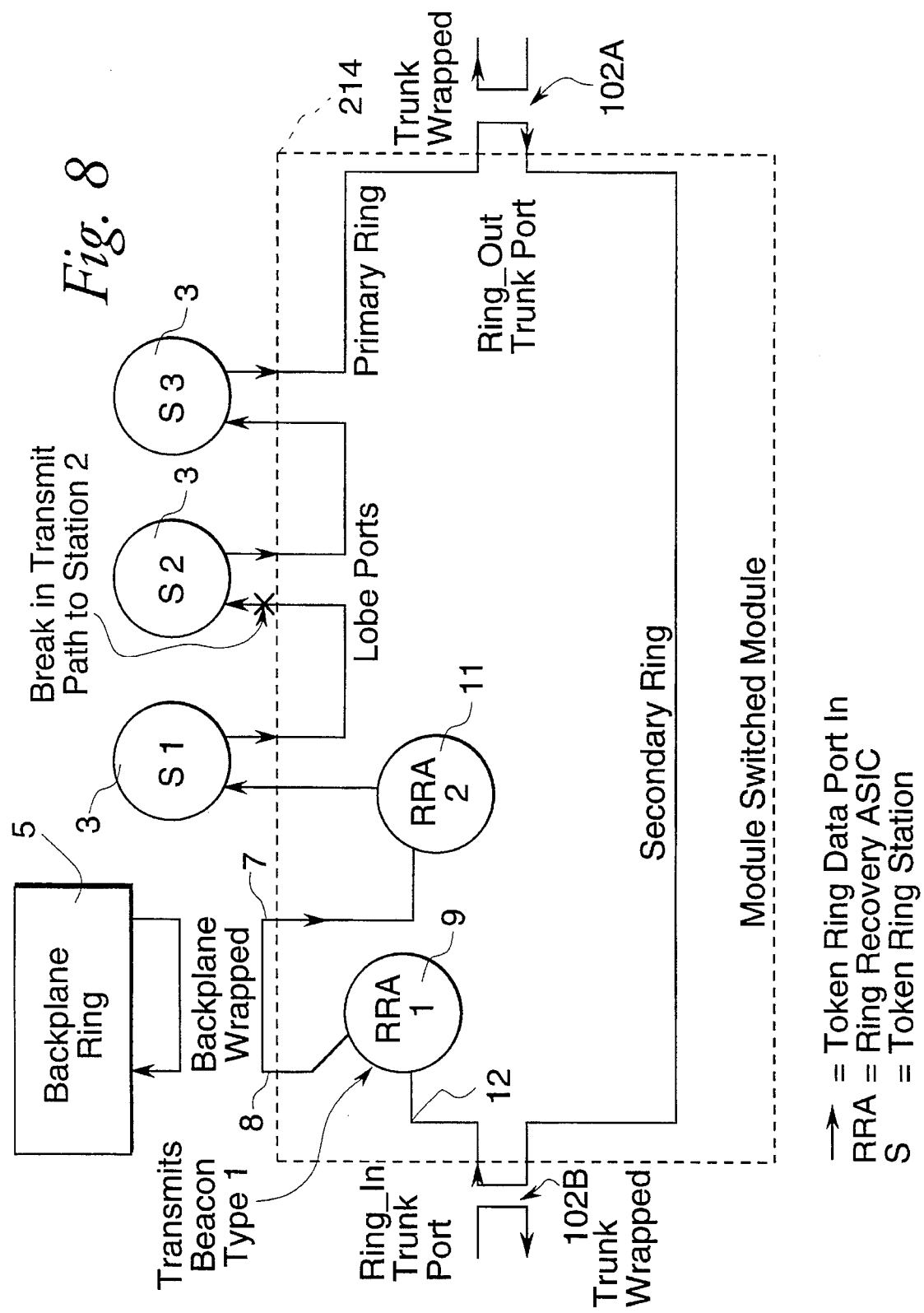
FIG. 8 is a schematic view of a module-switched module in fault-identification phase.

During the fault isolation phase, as shown in FIG. 8, the media module is isolated from other modules on the ring and the backplane connection for that ring is wrapped as well as any trunk ports 102A and 102B on the module. Ring recovery ASICs 9 is configured to transmit a beacon type 1 frame, as shown in FIG. 8. The module processor systematically wraps each port participating in that ring, preferably from downstream to upstream, and checks to see if beacon type 1 frames are being received at the downstream ring recovery ASIC 9. The module processor identifies the last lobe port which when wrapped, allows the beacon type 1 frame to be received at the downstream ring recovery ASIC 9. This port remains "beacon wrapped".

As can be seen in FIG. 8, the fault is present in the lobe segment that is in the transmit path from the module to station S2. The ring recovery ASIC 9 is transmitting beacon type 1 frames. Initially, the downstream ring recovery ASIC 9 does not receive the beacon type 1 frames. The module processor begins the process of wrapping the most downstream port and checking to see if the beacon type 1 frames are received at the downstream ring recovery ASIC 9. After wrapping the lobe for station 3 and then the lobe for station 2, the module processor detects beacon 1 type frames at the downstream ring recovery ASIC. Accordingly, the module processor unwraps the lobe for station 3 while the lobe for station 2 remains wrapped.

Figure 9:
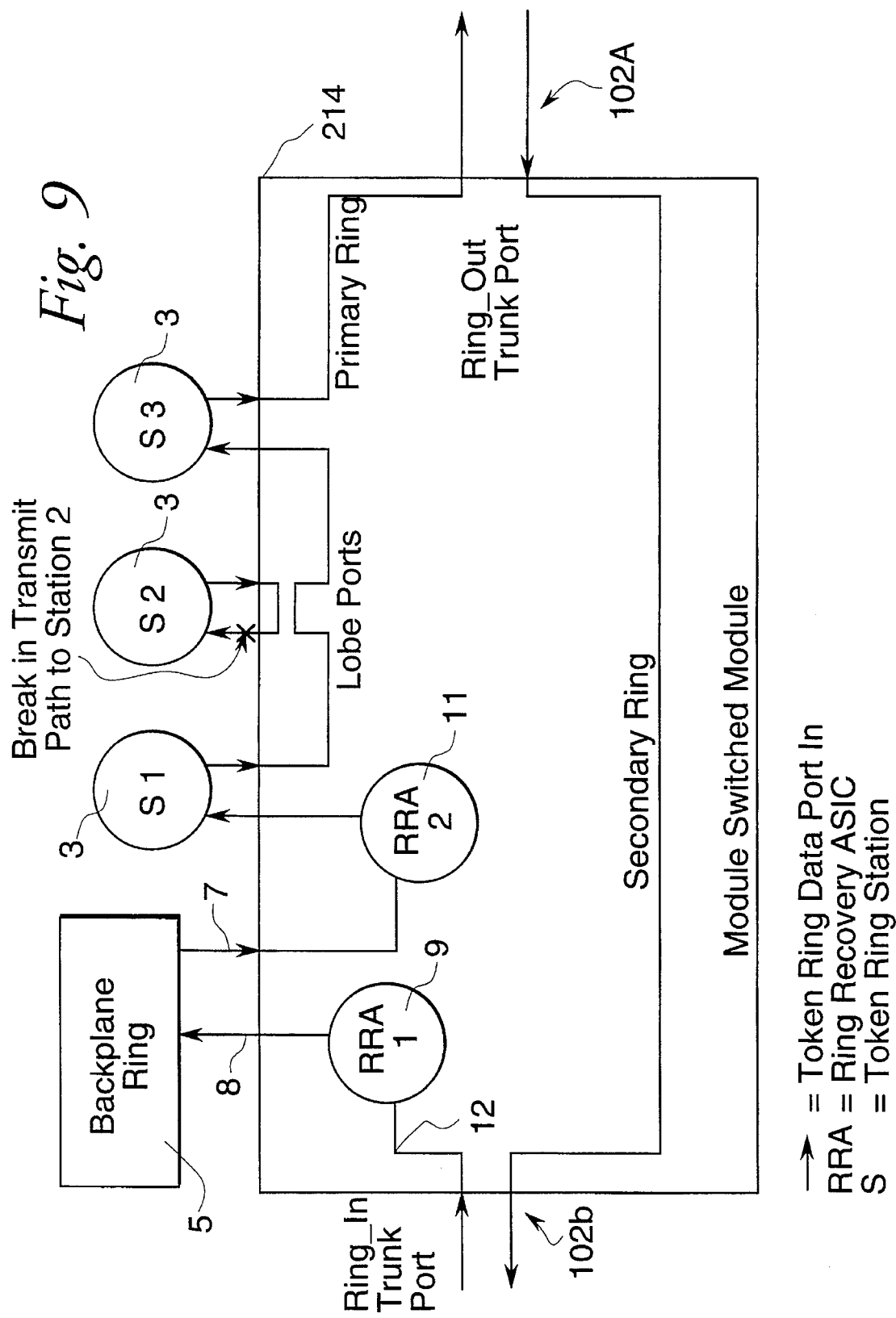
FIG. 9 is a schematic view of a module-switched module with a defective port isolated.

As shown in FIG. 9, all other temporarily-wrapped ports are unwrapped back onto the ring formed on the module. The ring recovery ASICs are instructed to stop transmitting beacon type 1 frames. A sufficient period of time is allowed to pass to allow all attached stations to exit beacon recovery prior to unwrapping temporarily-wrapped trunks and the connection to the backplane.

While specific embodiments of the invention have been shown and described in detail to illustrate the application of the principles of the invention, it will be understood that the invention may be embodied otherwise without departing from such principles.

What is claimed is:

1. A method for correcting a defect in a token ring network including a plurality of stations formed into a group, the method comprising the steps of:

monitoring an upstream end and a downstream end of the group for a beacon frame;

entering a port fault identification phase if said upstream end of the group receives a beacon frame and said downstream end of the group does not receive a beacon frame, said port fault identification phase including the steps of:

isolating the group from any other stations on the token ring network;

transmitting a beacon frame onto said upstream end of said group;

testing a portion of the token ring network adjacent each station in the group for a defect.

2. A method in accordance with claim 1, wherein:

said testing includes determining a presence of said beacon frame transmitted onto said upstream end of said group.

3. A method in accordance with claim 1, wherein:

the token ring network includes a plurality of groups of stations and each of said plurality of groups individually monitoring an upstream end and a downstream end of a respective group for a beacon frame, and then each group entering said port fault identification phase if said upstream end of the respective group receives a beacon frame and said downstream end of the respective group does not receive a beacon frame.

4. A method in accordance with claim 1, wherein:

the token ring network conforms to IEEE 802.5 communication standard protocol.

5. A method in accordance with claim 1, wherein:

the token ring network is implemented on a concentrator;

the group of stations are all connected to a single media module, said media module is connected to said concentrator;

the token ring network includes a plurality of groups of stations, each of said group of stations are all connected to a different media module connected to said concentrator, and each of said plurality of groups individually monitoring an upstream end and a downstream end of a respective group for a beacon frame, and then each group entering said port fault identification phase if said upstream end of the respective group receives a beacon frame and said downstream end of the respective group does not receive a beacon frame.

6. A method in accordance with claim 1, wherein:

the token ring network is implemented on a plurality of concentrators, the token ring network includes a plurality of groups of stations, each of said group of stations are all connected to a different media module connected to one of said concentrators, and each of said plurality of groups individually monitoring an upstream end and a downstream end of a respective group for a beacon frame, and then each group entering said port fault identification phase if said upstream end of the respective group receives a beacon frame and said downstream end of the respective group does not receive a beacon frame.

7. A method in accordance with claim 5, wherein:

said each media module includes a plurality of token rings, an upstream end and a downstream end of each of said token rings are monitored for a beacon frame, and said port fault identification phase is entered for a respective token ring if said upstream end of the respective token ring receives a beacon frame and said downstream end of the respective token ring does not receive a beacon frame.

8. A method in accordance with claim 1, wherein:

the group of stations are all connected to a single media module though ports on said media module, each of said ports including a ring monitor connected to an upstream side of a respective said port, said ting monitor detects a presence of said beacon frame transmitted onto said upstream end of said group;

a defect is indicated in a portion of the token ring network immediately upstream of a most upstream ring monitor not detecting a beacon frame.

9. A method in accordance with claim 8, wherein:

a most upstream ring monitor of the group performs said monitoring of said upstream end of the group for a beacon frame;

a most downstream ring monitor of the group performs said monitoring of said downstream end of the group for a beacon frame;

a ring recovery means performs said transmitting of said beacon frame onto said upstream end of said group.

10. A method in accordance with claim 1, wherein:

said group includes an upstream ring recovery mechanism and a downstream ring recovery mechanism said testing is performed by repetitively bypassing said portions of the token ring network adjacent different stations until said beacon frame transmitted onto said upstream end of said group is detected at said downstream end of said group.

11. A method in accordance with claim 10, wherein:

said group includes an upstream ring recovery mechanism and a downstream ring recovery mechanism, said upstream ring recovery mechanism performs said monitoring of said upstream end of the group for a beacon frame, said downstream ring recovery mechanism performs said monitoring of said downstream end of the group for a beacon frame, said upstream ring recovery mechanism also performs said transmitting of said beacon frame onto said upstream end of said group.

12. An apparatus for correcting a defect in a token ring network including a plurality of stations formed into a group, the method comprising the steps of:

monitoring means for monitoring an upstream end and a downstream end of the group for a beacon frame and indicating an on-module fault if said upstream end of the group receives a beacon frame and said downstream end of the group does not receive a beacon frame;

isolation means for isolating the group from any other stations on the token ring network after said on-module fault is detected;

ring recovery means for transmitting a beacon frame onto said upstream end of said group after the group is isolated;

testing means for testing a portion of the token ring network adjacent each station in the group for a defect.

13. An apparatus in accordance with claim 12, wherein:

said testing means includes means for determining a presence of said beacon frame transmitted onto said upstream end of said group.

14. An apparatus in accordance with claim 12, wherein:

the token ring network conforms to IEEE 802.5 communication standard protocol.

15. An apparatus in accordance with claim 12, wherein:

the token ring network is implemented on a concentrator;

the group of stations are all connected to a single media module, said media module being connected to said concentrator;

said monitor means, said isolation means, said ring recovery means and said testing means are positioned on said media module;

the token ring network includes a plurality of groups of stations, each of said groups of stations being connected to a different media module which is connected to said concentrator, each different media module including a monitor means, an isolation means, a ring recovery means and a testing means.

16. An apparatus in accordance with claim 15, wherein:

the token ring network is implemented on a plurality of concentrators, each of said plurality of concentrators including a media module connected to a group of stations and including a monitor means, an isolation means, a ring recovery means and a testing means.

17. An apparatus in accordance with claim 15, wherein:

said each media module includes a plurality of token rings, said monitor means monitors an upstream end and a downstream end of each of said token rings for a beacon frame, and an on-module fault is indicated for a respective token ring if said upstream end of the respective token ring receives a beacon frame and said downstream end of the token ring does not receive a beacon frame.

18. An apparatus in accordance with claim 12, wherein:

a single media module connects all the stations of the group though ports on said media module, each of said ports include a ring monitor means connected to an upstream side of a respective said port, said ring monitor means for detecting a presence of said beacon frame transmitted by said ring recovery means;

said testing means indicating a defect in a portion of the token ring network immediately upstream of a most upstream ring monitor not detecting a beacon frame.

19. An apparatus in accordance with claim 18, wherein:

a most upstream ring monitor of the group also forms part of said monitoring means by monitoring said upstream end of the group for a beacon frame;

a most downstream ring monitor of the group also forms part of said monitoring means by monitoring said downstream end of the group for a beacon frame.

20. An apparatus in accordance with claim 12, wherein:

said ring recovery means includes an upstream ring recovery ASIC and a downstream ring recovery ASIC said upstream ring recovery ASIC of the group also forms part of said monitoring means by monitoring said upstream end of the group for a beacon frame, said downstream ring recovery ASIC of the group also forms part of said monitoring means by monitoring said downstream end of the group for a beacon frame;

said testing means repetitively bypasses said portions of the token ring network adjacent different stations until said beacon frame transmitted by said ring recovery means onto said upstream end of said group is detected at said downstream end of said group by said downstream ring recovery ASIC.

* * * * *